Dec. 2, 1969  A. P. STEADMAN  3,481,101
METHOD OF MAKING HERMETICALLY SEALED SKIN PACKAGES
Filed March 27, 1967  3 Sheets-Sheet 1

INVENTOR.
ALLEN P. STEADMAN
BY
Ralph R Roberts
AGENT

Dec. 2, 1969  A. P. STEADMAN  3,481,101
METHOD OF MAKING HERMETICALLY SEALED SKIN PACKAGES
Filed March 27, 1967  3 Sheets-Sheet 2

INVENTOR.
ALLEN P. STEADMAN
BY
Ralph R. Roberts
AGENT

Dec. 2, 1969     A. P. STEADMAN     3,481,101
METHOD OF MAKING HERMETICALLY SEALED SKIN PACKAGES
Filed March 27, 1967     3 Sheets-Sheet 3

INVENTOR.
ALLEN P. STEADMAN
BY
Ralph R. Roberts
AGENT

# United States Patent Office 3,481,101
Patented Dec. 2, 1969

3,481,101
METHOD OF MAKING HERMETICALLY SEALED SKIN PACKAGES
Allen P. Steadman, Henrietta, N.Y., assignor to William E. Young, Stamford, Conn.
Filed Mar. 27, 1967, Ser. No. 626,066
Int. Cl. B65b 55/10, 63/00
U.S. Cl. 53—22     1 Claim

ABSTRACT OF THE DISCLOSURE

A packaging method providing a hermetically sealed skin package in which a lower or one-half package portion is of polyethylene film, sheet or other impervious sheet material and into preselected portions thereof a pattern of apertures is formed. The product to be packaged is placed on the lower portion and between apertured portions after which a heated sheet of polyethylene film is draped onto the product and the lower package portion. Vacuum from the underside of the lower portion is applied to the apertures to remove air from between the upper and lower portions to permit the two package portions to encase the product, to meet and seal, and to provide a hermetically sealed product with the apertures in the lower member sealed by the heated upper sheet.

BACKGROUND OF THE INVENTION

Field of the invention

This invention pertains to the general class of package making and in particular to the subclasses of methods; with contents treating with vacuum or gas; with a receptacle formed with a differential stretching or shrinking of the cover; with a contents material treating by vacuum or inert atmosphere; and with forming or partially forming the receptacle and subsequent filling and by differential stretching or shrinking of cover.

This invention provides a packaging method, the results of which produce a package generally similar to those found in the general class of foods and beverages and in the processes and products with hermetic sealing and in the particular subclass of packaging, wrapping and casing.

Description of the prior art

The art of skin packaging is well known and its method of mounting and retaining one or more items upon a porous cardboard backing is also well known and is disclosed in several patents—among them being Canadian Patent No. 555,219 to Moncrieff issued on Apr. 1, 1958. Other patents of a like nature are seen in U.S. Patent No. 2,912,805 to Maynard of Nov. 17, 1959, and U.S. Patent No. 2,861,404 to Stratton of Nov. 25, 1958. In these patents, as well as many similar type patents, the packages formed provide a practical display means as well as a protective encasing of the item, however, these packages, by virtue of the mounting board, are not hermetically sealed.

The art of drawing a heated plastic film around items to be packaged is shown in U.S. Patent No. 2,958,172 to La Branche of Nov. 1, 1960. This package provides no mounting board, but instead is a single sheet of film drawn sufficiently around the item so as to provide a retaining means for the hardware of the package. Other skin packaging, representative of the art, is seen in U.S. Patent No. 3,154,898 to Engles of Nov. 3, 1964, in which a foam polyethylene sheet is used as the porous mounting sheet. In U.S. Patent No. 2,976,658 to Kostur of Mar. 28, 1961, there is shown a method in which multiple packages are made by utilizing a relatively stiff permeable sheet of cardboard and forming a plurality of packages by means of separate vacuum forming chambers.

In the above-cited art and in other known processes and packages not covered by these patents, the novel forming of a hermetically sealed package in which a vacuum is drawn through apertures in an impervious bottom member and is used to provide a sealing pressure and to evacuate the air from between the bottom member and cover is, as far as is known, a new art. The advantage of hermetic sealing, of course, is well known, and in the invention to be hereinafter more fully described it is contemplated that the package formed of impervious material, such as polyethylene film and the like, will provide a package in which the contents are hermetically sealed and protected from unwanted exposure to bacteria, oil, grease, moisture, and the like.

SUMMARY OF THE INVENTION

The method of this invention contemplates the use of a lower strip of polyethylene film which is treated for printing and is printed by a flexographic printing device of well-known commercial design. After printing, the strip is brought in the way of a perforating and sized head in which a determined pattern of apertures are formed. After perforating, the lower polyethylene film is advanced to a cutting station whereat the film is dimensionally cut to a determined size. After cutting, each perforated sheet of lower film is placed upon a vacuum form platen having a plurality of spaced vacuum connected passageways adapted to coincide with the apertures formed in the film. Within the determined pattern of apertures of perforations a multiplicity of products is placed on the unperforated intermediate portions of the lower film member after which a second or upper sheet of heated polyethylene film is draped onto this lower sheet. With this draping of the heated sheet, vacuum is applied to passageways in the form platen to remove the air from between the sheets of polyethylene film and through the perforations in the bottom sheet. This evacuation permits the two sheets of film to meet and seal with the products therebetween packaged and retained in a hermetically sealed condition between the two pieces of polyethylene film.

It is, of course, to be noted that the upper heated polyethylene film is sufficiently warmed to provide a ready seal with the lower film and forms a heat sealed package which, incidentally, provides a package complying with the military specifications for individually packaging large or small quantities or single items of products such as gaskets, screws, seals, etc. This method of packaging falls within the military unit packaging specifications complying with grease-proof, acid-proof, water-resistant, and heat sealed requirements covered under many military specifications. In the process of drawing the heated upper film into sealing engagement with the lower film by the application of vacuum it is to be noted that the heated film as it adheres to the lower member provides a complete hermetic seal around each aperture so that the resulting package is hermetically sealed.

It is therefore an object of this invention to provide a method whereby a preselected arrangement of a multiplicity of small apertures are provided in an impervious bottom member and after the positioning thereon of the products to be packaged the products are covered by a heated thermoplastic film adapted to seal to the lower member and by the application of vacuum to the apertures in the bottom member the upper heated film is drawn toward the bottom member while the air between the films is purged into the vacuum system and with the upper film meeting and sealing with the bottom member.

It is a further object of this invention to provide a process which is inexpensive in the production of individual packages; which is highly reliable, and requires a minimum of apparatus to provide a high speed packaging production line.

It is a further object of this invention to provide a process which produces hermetically sealed packages in a continuous manner, which is highly reliable and inexpensive in the cost of packaging.

It is a further object of this invention to provide a method for the packaging and hermetically sealing of a product or products in which the lower portion of the package is a tray of impervious material having a flange portion into which a plurality of apertures is formed. It is further contemplated that, when desired, these apertures may also be provided near the flange portion and in the sidewalls of the lower tray and after the lower tray is filled with the product a cover of heated thermoplastic film is draped upon the tray. With the application of vacuum to the underside of the tray and at the location of the apertures the heated film is drawn into heat sealing engagement with the flange and/or the upper inner wall of the bottom member to form a hermetically sealed package.

It is a further object of this invention to provide a simple inexpensive packaging process in which a selected pattern of perforations in a lower impervious member of the package provides passageways through which a vacuum is drawn so as to urge and pull a heated upper portion of thermoplastic film into a heat sealed condition with the lower member to provide a hermetically sealed package absent the use of heat sealing by heat pressure irons.

This process seals at the perforated portion of the package and provides between the members a film retention of the parts so that the hermetically sealed package is easily opened as by cutting the package inside the sealed edge. A plurality of packages may be formed as a single sheet with the portions between each of the sealed portions subsequently serrated so as to provide easily detachable sealed packages so that one or more packaged parts may be separated from the sheet, as desired, with the balance of the packaged parts being hermetically sealed in the remaining sheet portion.

There has been outlined rather broadly the most important features of the method for providing one or more hermetically sealed packages of this invention in order that the present contribution to the art may be more fully appreciated. Those persons skilled in the art will appreciate that the concept on which the present disclosure is based may be utilized to provide the basis for methods similarly carrying out the purposes of this invention. There has been chosen a specific embodiment of apparatus and a plurality of packages for the purposes of illustration and description of the methods of this invention which are shown in the accompanying drawings and forming a part of this specification wherein:

DESCRIPTION OF THE PREFERRED EMBODIMENTS

Figure 1:
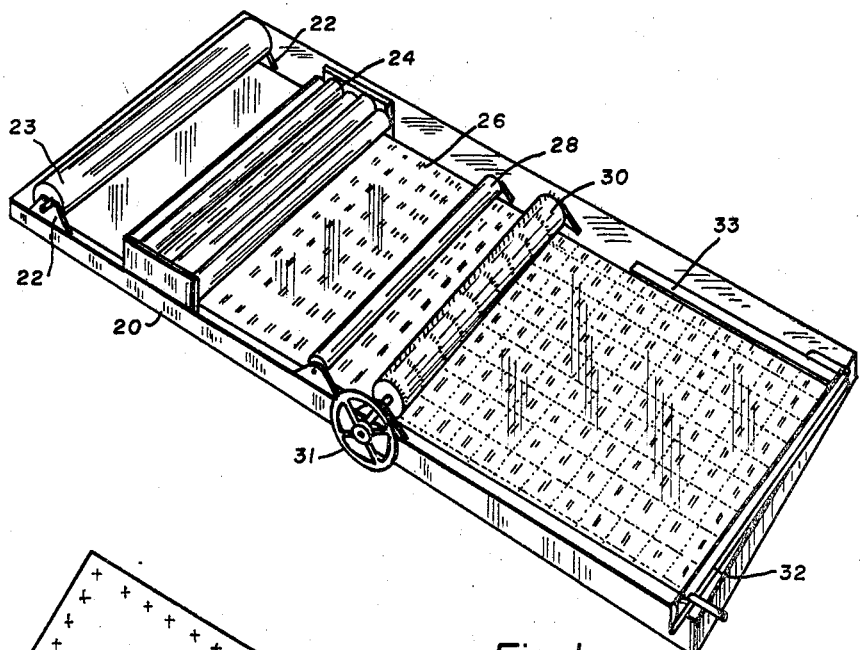
FIG. 1 represents a perspective view of one form of apparatus whereby the method of this invention may be accomplished.

Referring next to the drawings in which like numbers refer to like members throughout the several figures and in particular to FIG. 1 where is shown an apparatus whereby the method of this invention may be performed. Within a frame 20 there is provided supports 22 in which is carried a roll of treated polyethylene film 23, or the like, which film is preferably a few thousandths of an inch thick. In one reduction to practice, this roll is 20 inches wide and six hundred feet long and is fed to a flexographic printing device of standard commercial design identified as 24 in which device indicia 26 is applied to one surface of the film. From the printing operation the film passes underneath a roller 28 and to and under a perforating and sizing head 30. The roller 28 may be adapted to produce a smoothing and tensioning of the film as it is perforated by head 30.

This head 30, as exemplified, is in the nature of a roller in which are provided a plurality of double rows of pins which in the present instance are approximately fifty thousandths of an inch in diameter and are precisely spaced on the roller so that both longitudinal and horizontal rows of apertures are formed in the film as it is precisely fed underneath this sizing head. The pins are pointed and engage a film support roller not shown. A pulley 31 adapted to rotate head 30 may be connected to a power source not shown and may be used to advance the film through the apparatus. The film support roller may be resiliently covered, or may be a hard surfaced roller having grooves or holes adapted to receive the pointed ends of pins. The grooved roller of course is rotated in timed relationship to head 30 to prevent damage to the pins. As the film for the bottom member may be rather thin, as for example, three thousandths of an inch thick, the head 30 may have a rubber stripper on its outer circumference. The pins extend nearly through the rubber stripper so that as the apertures are formed the stripper is compressed by the support roller. As the pins move from engagement with the support roller the stripper expands to push the film from the pins.

The film from head 30 is advanced to the end of the frame 20 whereupon its advancement is stopped and a knife 32 is moved up a scale guide 33 to a predetermined point whereupon the film is cut between parallel rows of apertures to provide a bottom sheet having a determined amount of bottom film portions defined by rows of apertures. This bottom sheet now printed, cut and with precisely spaced pairs of rows of apertures is then transferred to a vacuum form platen for further operations.

Figure 2:
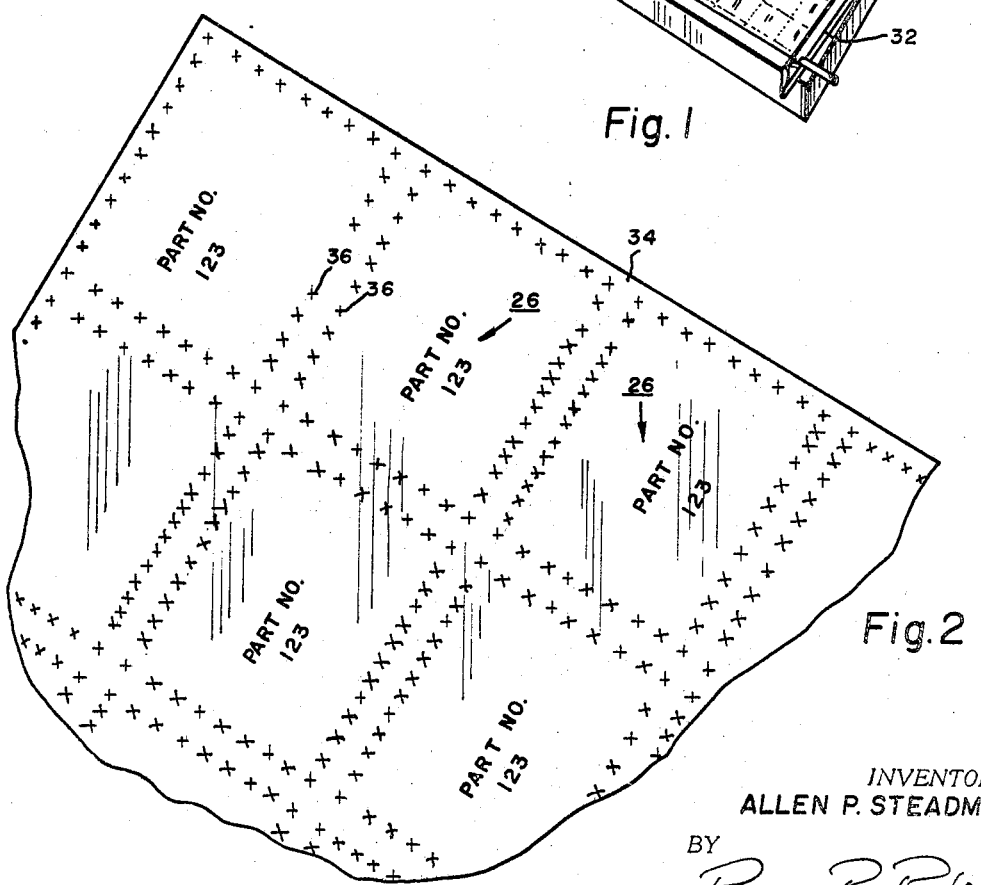
FIG. 2 represents an enlarged view of a bottom sheet of impervious material which may be printed and perforated with the apparatus of FIG. 1.

Referring next to FIG. 2 it is to be seen that a cut sheet portion 34 has apertures indicated as by x's—these apertures being identified as 36 and forming double rows both longitudinally and horizontally. In between these rows there has been printed by the flexographic printing device the indicia 26 which, as an example, reads "Part No. 123."

Figure 3:
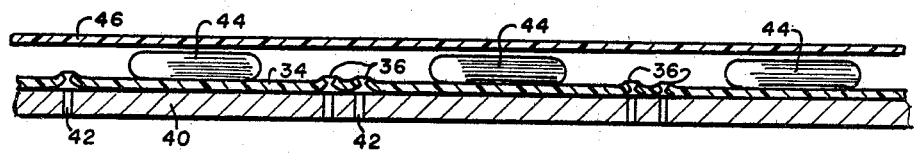
FIG. 3 represents a cross-sectional view of a first package assembly just prior to the forming thereof.
Figure 4:
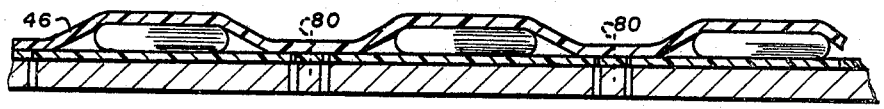
FIG. 4 represents a cross-sectional view of the hermetically sealed package of FIG. 3 after the sealing thereof by application of vacuum to the lower member.

Referring next to FIG. 3 it is to be seen that bottom sheet 34 and the apertures 36 have been placed upon a vacuum form platen 40 having a plurality of vacuum passageways 42 provided therein, said passageways being disposed to connect with the apertures 36 of the film 34. Placed upon the film 34 and between the apertures are products 44 after which a second or top sheet of heated polyethylene film 46 is draped onto the products 44 and lower sheet 34 after which the vacuum is applied to draw the heated film 46 into the hermetically sealed position shown in FIG. 4. As the vacuum is applied, of course, the air between the upper and lower films 34 and 46 is evacuated through the apertures 36, and as the two sheets of film meet, they are heat and hermetically sealed.

Figure 5:
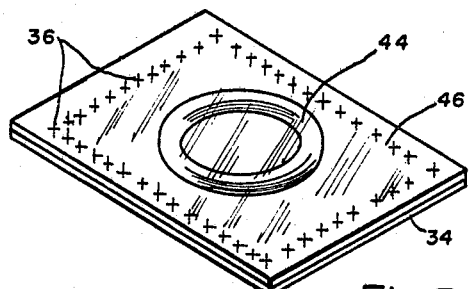
FIG. 5 represents an isometric view of a packaged product of the package of FIG. 4.

Referring next to FIG. 5 in which the hermetically sealed sheet assembly has been cut to provide a multiplicity of single product packages, it is seen that the product 44 is hermetically sealed between the upper and lower sheets 46 and 34 and that apertures 36 are disposed adjacent the outer edges and between the edges and the packaged product 44.

Figure 6:
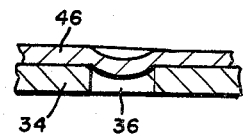
FIG. 6 represents a fragmentary and somewhat diagramatic enlarged cross-sectional view of the package of FIG. 4 showing the hermetic sealing of one aperture.

Referring particularly to FIG. 6 and the method of sealing the apertures 36, the enlarged view shows somewhat diagrammatically the upper film 44 drawn tightly and sealed to the lower film 34. It is noted that the upper film has a tendency to partially enter any void of the aperture to form a very tight seal therearound.

Figure 7:
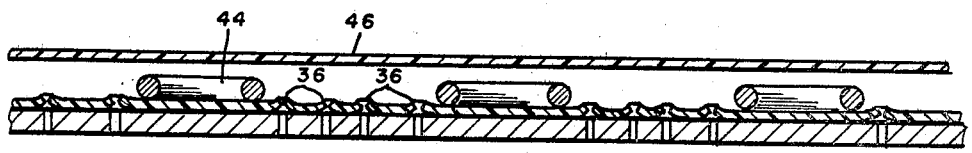
FIG. 7 represents a cross-sectional view similar to FIG. 3 and showing an alternate or second package assembly with yet another pattern of apertures positioned just prior to the application of vacuum.
Figure 8:
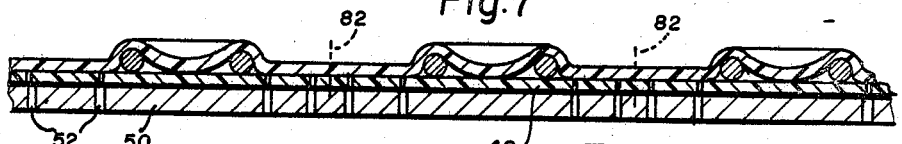
FIG. 8 represents a cross-sectional view of the hermetically sealed package of FIG. 7 after the application of vacuum to the lower member.
Figure 9:
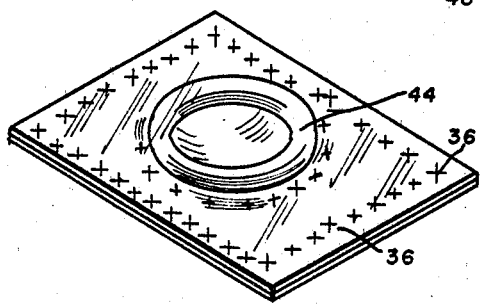
FIG. 9 represents an isometric view of a packaged product of the package of FIG. 8.

Referring next to FIGS. 7, 8 and 9 a second package is shown in which, when it is desired to have the film drawn closely to the packaged product, there are additional apertures 36 formed in the lower sheet so that the product 44 when precisely positioned upon a lower sheet 48 is closely surrounded by a plurality of apertures 36 as in the enlarged view of FIG. 7. Vacuum form plate 50 is provided with vacuum passageways 52 adapted to draw the air between the sheets of film and through the apertures 36. When the vacuum is applied as in FIG. 8 the upper heated sheet of polyethylene film is drawn to and into a hermetic sealing contact with the lower film 48 to provide the tightly encapsulated packaged product seen in FIGS. 8 and 9.

As an alternate to the platens 40 and 50, a porous platen may be used to conduct vacuum to the aperture 36 to avoid registering the apertures with specific holes such as 42 and 52 in their platens. Predrilled stainless steel sheet metal with fifty thousandths of an inch diameter holes arranged in one-tenth inch spacings or heavy wire screen on a vacuum platen is also adaptable to provide a support surface in which the vacuum openings therein are always in the way of the apertures of the lower member. Those areas of the lower member without apertures therein are drawn to the other vacuum openings by the application of the vacuum and, as thus retained, the wrinkling of the film produced in the heat sealing operation is minimized.

Figure 10:
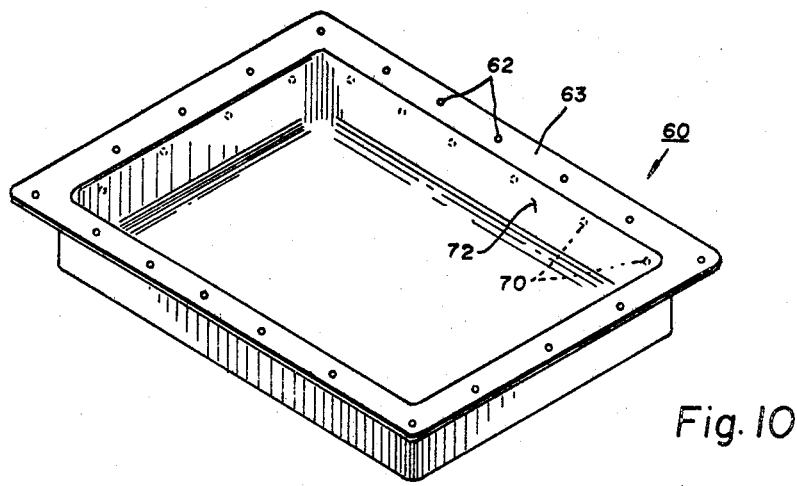
FIG. 10 represents an isometric view of a bottom tray prior to the filling and application of the cover thereto.
Figure 11:
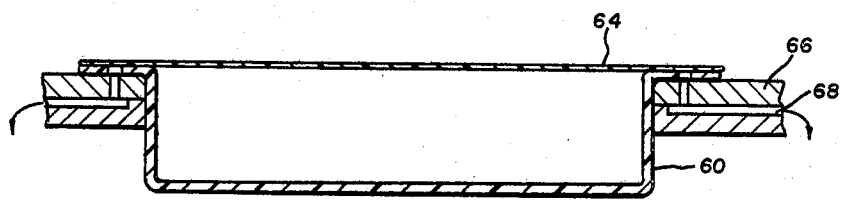
FIG. 11 represents a cross-section of the tray of FIG. 10 covered and sealed by a thin upper film.

Referring next to FIGS. 10 and 11 it is to be noted that a tray 60 made of impervious material such as polyethylene or other like material is provided with a plurality of apertures 62 in a lip 63. After the tray is filled, a second heated cover film 64 is draped upon the tray and through a vacuum form platen 66 and vacuum passageways 68 a vacuum is applied so that the air within the package is drawn from the package and the film 64 is drawn into heat sealing condition with the tray 60 to form a hermetic seal of the cover 64 to the tray lip 63.

Figure 12:
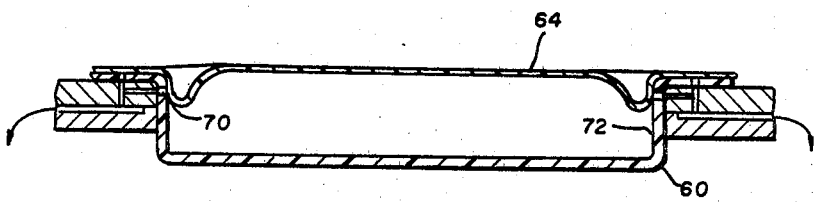
FIG. 12 represents a cross-section of the tray of FIG. 10 but with apertures provided in the upper sidewalls of the tray and with the upper film cover sealed to the lip and upper walls of the tray.

It is to be further noted in FIG. 12 that additional apertures 70, indicated in dashed outline in FIG. 10, may be provided in the upper sidewall 72 of the tray 60 whereupon the heated film 64 is not only drawn into sealing contact with the lip 63 of the tray 60 but also is drawn down partially into the cavity to form the upper side engaging and hermetically sealed package as seen in FIG. 12.

It is also to be noted that the tray need not be of a material like the cover but may be of some other impervious material which has its lip surface treated to provide a contact area in which the heated cover film is readily drawn and positively adhered to in a heat sealed fashion. The heated thermoplastic cover film is drawn tightly into sealing position by means of the vacuum applied to the several apertures.

It is particularly to be noted that the sealing of the heated film to the tray does not require auxiliary heat sealing bars but after the tray is sealed a pressure roller may be used to insure that the film is smoothly applied to the lip of the tray to move any unwanted wrinkles therefrom.

Figure 13:
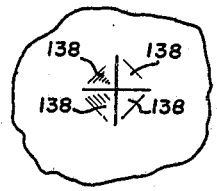
FIG. 13 represents in greatly enlarged scale a fragmentary plan view showing an alternate aperture formed in a lower film.
Figure 14:
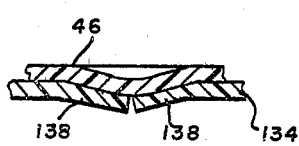
FIG. 14 represents in cross-section the sealing of an upper film to the aperture construction of FIG. 13.

Referring finally to FIGS. 13 and 14 there is illustrated an alternate construction of an aperture. The pins forming the aperture of FIG. 13 is pointed by tapering in four intersecting planes. This point as it cuts an aperture 136 in bottom member 134 forms four flap portions 138. The size of the flap is controllable by controlling the penetration of the pin into the film. In FIG. 14 is seen the flap portions 138 of bottom member 134 as they, the portions, are sealed to the heated upper film 46. Of course, the aperture forming point on the pin can be diamond shaped or triangular shaped, the point providing an aperture in which the displaced portion of the film is formed as flaps.

USE AND OPERATION

It is readily seen that the above method as shown and described provides a means for hermetically packaging simultaneously in a high speed manner a large quantity of similar items which after the forming of the sheet of sealed items may be cut apart to form the single packaged products seen in FIGS. 5 and 9. The packaged products also may be left in a sheet form with serrations between the spaced rows of apertures, as for example, at 80 in FIG. 4 and at 82 in FIG. 8. The final packaged arrangement is merely a matter of selection and desire to satisfy the packaging conditions under which the products are furnished. It is readily seen that if packages are maintained in strips or groups of ten or the like that ready inventory may be maintained. From these groupings the products may be individually separated for transport to other locations as desired with the contents still hermetically sealed until the film sealing the product is ruptured and the product removed. In like manner it is readily seen that although a tray 60 is shown in FIGS. 10, 11 and 12 that other preforms adapted to particularly hold and retain a particular product may be made and used. These preforms of course are often made by the vacuum form process.

It is of course readily apparent that instead of vacuum applied to the underside of the lower member, air pressure on the outer or upper side of the heated film may be used to press the film against the lower perforated sheet with the perforations exposed to the atmosphere to permit the air trapped between the two films to be expelled as the package is hermetically sealed.

It is an intent of this invention to provide a package which is hermetically sealed but which does not necessarily provide a complete evacuation of all of the air or gas around the product or products but positively provides a barrier by means of the impervious materials used to form the package to hermetically seal and maintain the packaged product free of contact with bacteria, grease, acid, water, and other possible contaminants as required by the various material packaging specifications of the military and like customers.

Although the perforations shown in FIGS. 3 and 7 are indicated as having their displaced portions extending toward the heated upper sheet this is merely a matter of selection. The displaced portions may be directed toward the vacuum platen if desired, and in many cases of a thin film, the displacement from the plane is nearly nonexistent. In the apertures formed as in FIG. 13, the flap portions 138 lie in the plane of film 134 until vacuum is applied whereupon the flaps move toward the vacuum until cover 46 engages the surface of lower member 134. Upon engagement, the memory of the film is great enough for the flap portions 138 to move again to the plane of the lower member 134. The flaps, as they move, encounter the heated upper film and are sealed thereto.

It is contemplated that a roll of film may be printed, perforated and rerolled for transport to a separate packaging operation. These packages may contain all the same item or may contain a series of different items arranged in a determined array. Such a series of packages may contain, in kit form, all of the components of an assembly with the components packaged in a determined sequence.

The size and spacing of the apertures are selectively made in response to the packaging requirement. The larger and greater the quantity of apertures the faster is the evacuation of the air from between the members. The spacing of the apertures from the product as in the manner of FIGS. 4 and 8 also provides a means for adjusting the tightness of the package around the product. The size of the apertures and the quantity in conductive relationship to the supply of vacuum is a factor determining the vacuum supply required.

METHOD

The method of the above-illustrated and described invention contemplates the steps as follows: perforating an impervious lower member with a multiplicity of apertures arranged in a determined array and with an intermediate extent of unperforated member within the pattern of apertures; disposing the lower member upon an evacuation form platen with the apertures of the lower member in flow connected relationship with an evacuating conducting means in the platen; arranging a product to be packaged upon one of the unperforated portions of the lower member; draping an upper sheet of heated thermoplastic film onto the product and lower member; applying a pressure differential such as vacuum to the conducting means of the evacuation form plate to expel or draw air and the like from between the lower member and the heated thermoplastic film to draw the facing surfaces of the film and member to each other to meet and form a hermetical heat seal, and removing the hermetically packaged product from the evacuation form platen for later operations such as trimming, serrating, and/or storage as determined by the customer requirements.

It is further contemplated that in the steps of the above method that instead of vacuum being applied to the evacuating conducting means an application of a positive pressure to the outer surface of the heated thermoplastic upper film may be used to urge the film toward the lower member to expel the air from between the film and lower member and through apertures therein and into a positive pressurized heat sealing engagement.

It is further contemplated that instead of a sheet-like lower member having a plurality of unperforated portions for the placing on each of the said portions a product there is provided a tray or the like having in its lip and sometimes its upper side portion a series of perforations adapted for flow connection to a vacuum source.

Terms such as "left," "right," "up," "down," and the like are applicable to the embodiments shown and described in conjunction with the drawings. These terms are merely for the purposes of description and do not necessarily apply to the position in which the apparatus and packages made therefrom may be constructed or used.

The conception of the apparatus and the hermetically sealed packages made thereby its many applications is not limited to the specific embodiments shown but departures therefrom may be made within the scope of the accompanying claim and without sacrificing its chief advantages and protection is sought to the broadest extent the prior art allows.

What is claimed is:

1. A method of making a hermetically sealed skin package in which the packaged product is enclosed and retained between upper and lower members of initially impervious material and, absent a sealing bar, said members are heat sealed in the areas immediately adjacent the product, the method including the steps of:

(a) preforming an impervious lower member to provide a lip portion and a sidewall portion extending from the lip, the impervious material of this lower member being a plastic film, a plastic coated substrate and like strips of material having an upper surface to which a thermoplastic film may be heat sealed;

(b) perforating the lip portion of the lower member to provide a plurality of apertures therein;

(c) perforating the upper sidewall portion of the lower member to provide a plurality of apertures therein, the pattern of apertures in the lip and sidewall being arranged in a determined array to define an intermediate extent of unperforated member within the pattern of apertures;

(d) disposing the preformed lower member in a nested condition in a recess provided in an evacuation form platen said form platen being provided with evacuating conducting means disposed to be in flow conducting alignment with the apertures in the preformed lower member when the preform is seated in the platen;

(e) arranging a product to be packaged within the pattern of apertures and on the intermediate extent of unperforated lower member;

(f) draping an upper member in the form of a sheet of thermoplastic film over and onto the product and lower member, the upper member being heated so as to provide an adhesive attraction to the lower member when and as it comes in contact with the upper surface of the lower member;

(g) applying a pressure differential to the heated upper member to urge the heated member toward the lower member to expel through the pattern of apertures in the lower member the air from between the upper and lower members and with the upper member closing and sealing the apertures when the facing surfaces of the film and lower member meet to form a hermetic heat seal of the packaged product, and (h) removing the hermetically packaged product from the evacuation form platen for later operations such as separating, trimming and the like.

References Cited

UNITED STATES PATENTS

| | | | |
|---|---|---|---|
| 2,927,409 | 3/1960 | Heyer | 53—22 |
| 2,984,056 | 5/1961 | Scholl | 53—22 |
| 2,750,719 | 6/1956 | Wandelt | 53—22 |
| 3,061,984 | 11/1962 | Mahaffy | 53—22 |

TRAVIS S. McGEHEE, Primary Examiner